A. G. THOMSON.
TIRE ARMOR.
APPLICATION FILED APR. 1, 1909.
953,071.  Patented Mar. 29, 1910.
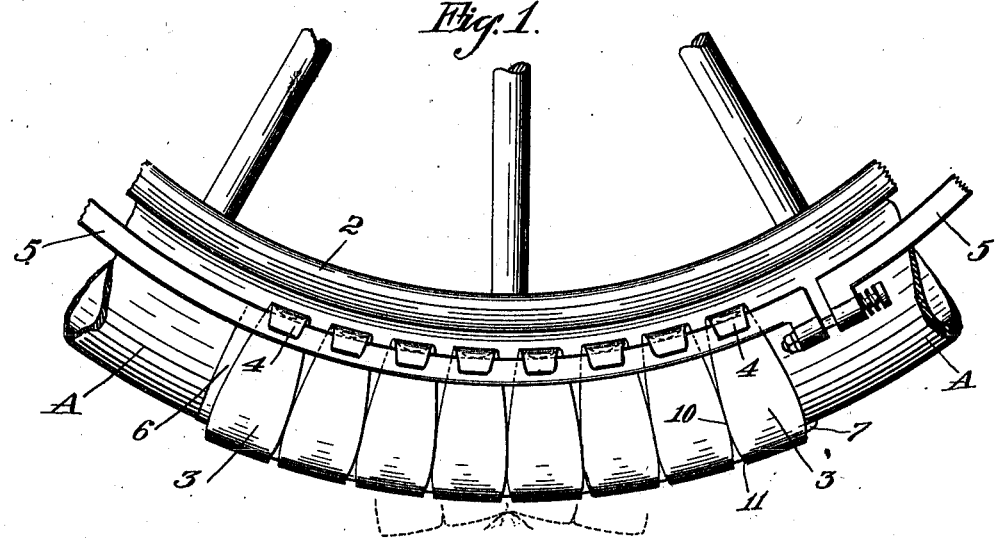
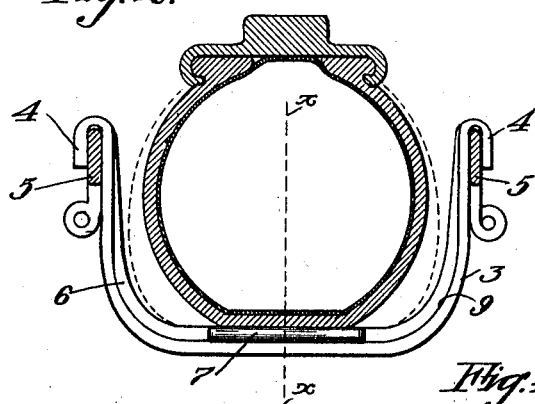
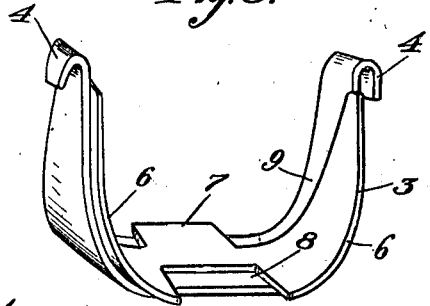
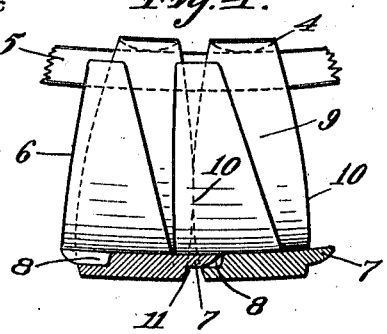
WITNESSES;
R. S. Berry,
F. E. Maynard.
INVENTOR
ARTHUR GALE THOMSON
BY Geo. H. Strong
HIS ATTORNEY.

UNITED STATES PATENT OFFICE.

ARTHUR GALE THOMSON, OF SAN FRANCISCO, CALIFORNIA, ASSIGNOR OF ONE-HALF TO ALBERT SUTTON, OF SAN FRANCISCO, CALIFORNIA.

TIRE-ARMOR.

953,071.  Specification of Letters Patent.  Patented Mar. 29, 1910.

Application filed April 1, 1909. Serial No. 487,156.

*To all whom it may concern:*

Be it known that I, ARTHUR GALE THOMSON, citizen of the United States, residing in the city and county of San Francisco and State of California, have invented new and useful Improvements in Tire-Armor, of which the following is a specification.

My invention relates to a metallic armor for automobile and like pneumatic tires.

Various efforts have been made to produce a satisfactory armor for tires which will protect them against puncture, and which will possess the necessary requisites of flexibility, noiselessness, durability and lightness. As a result of a long series of experiments and practice along these lines I have devised a tire armor which possesses these desired requisites, and of which the following is a description:

The invention consists of the parts, and the construction and combination of parts, as hereinafter more fully described and claimed, having reference to the accompanying drawings, in which—

Figure 1 is a side elevation of a portion of a wheel, illustrating the invention. Fig. 2 is a cross section thereof. Fig. 3 is a perspective of one of the armor sections. Fig. 4 is a section on line *x—x* of Fig. 2.

A represents an ordinary pneumatic tire of an automobile, or other wheel; and 2 the rim to which the tire is secured in any suitable fashion.

3 represents the armor sections, each consisting of a rigid metal plate, of which sections there are a sufficient number to reach around the tire, with the sections abutting snugly against each other close to the tread, and entirely inclosing the tire when the armor is assembled for use. The peculiar construction and mode of operation of these sections, with respect to one another, constitutes the essence of the present invention. As shown in Fig. 3, these sections are substantially U-shaped, in cross section and wider than the inflated tire when the latter is not resting on the ground so as to leave sufficient room on each side of the tire for the latter to expand under the load. The sections are wider at the bottom than at the top, and the upper and narrower ends form outwardly curved hooks 4 which clasp the rings 5 on each side of the tire, and hold the armor circumferentially on the wheel. These sections are preferably drop-forged, and are provided with the inside lateral flanges 6 along one edge, and a projecting tongue 7 centrally of the tread portion on the opposite edge, so that the tongue portion 7 of one section will seat in the adjacent recess 8 of another section, and between a corresponding pair of the lateral projecting flanges 6; correspondingly a pair of flanges 6 on one section will seat in respective lateral recesses 9 of another section, and which recesses 9 flank an intermediate tongue 7. It will thus be seen that these various tongues, flanges and recesses provide an interlocking means for each section along the tread portion thereof, which is very important in an armor of this character. The sections also have convex edges forming a rolling bearing, one against the other, at their edges, at a point very close to the tread and near to the ground, and which point is represented approximately at 10, in Figs. 1 and 4.

The side edges 11 of the tread portion of adjacent sections are all substantially parallel, but slightly out of contact when the sections are not directly on the ground, consequently the points of pivotal contact 10 of the two sections may be said to be between the top and bottom of the sections, but very close to the bottom. These points 10 of contact between the opposed vertical convexed edges of the sections must be near the tread, because if it is too high the sections will rock on one another in such a way as to break the rings 5, while if the pivotal points of contact 10 are too low, the armor will destroy the resiliency of the tire, and not permit the armor to bend inwardly or reentrantly, as for example in striking a rock, as indicated in dotted lines in Fig. 1. In other words, the requisites of a successful tire armor of this section demand a flexibility of the tire armor not only from an ordinarily curved position to a flattened position, when running on the ground, but also to a reëntrant position, so that the tire may be pushed in more or less at any one point, where a particular obstruction is encountered.

Experience has shown that if the point 10 is too high, even heavy steel rings at 5 will be broken, but the present construction, here shown and above described, allows much lighter rings to be used with perfect safety, and in fact it is not necessary that these rings should be absolutely tight. This is of great importance as shown in practice.

The side tongues 6 are carried up the sides of the sections and overlap into the recesses 9 of the succeeding sections, and both sides of the tongues 6 are rounded so as to prevent the cutting of the rubber tire. It also is to be noted that the central tongues 7 are curved and tapered on their under side so that they will have a rolling motion rather than a noisy, sliding one on the floors of the recesses 8. By this construction of interlocking tongues and grooves of the sections, the periphery of the armor is practically continuous and smooth. By rounding the various points of contact, the sections all have a rolling, pivotal action one on the other. There is no slipping or sliding, consequently there is no noise or click, and this is quite important. Each section stays where it is placed because the loose rings 5 travel; the sections tilting on their pivots 10, near the tread, clutching the ring and pulling it around while the sections stay still. The inside of the hooks 4 are convexed so as to permit of this rolling motion of the sections. Furthermore, the interlocking tongues and recesses prevent any side slip of the sections, one on the other.

Having thus described my invention, what I claim and desire to secure by Letters Patent is—

1. A tire armor comprising a circumferential series of substantially U-shaped metal plates, said plates in rocking contact at their edges adjacent to the tread, each of said plates having centrally of the tread portion a tongue and a groove, with the tongue of one plate adapted to interlock with the groove of the adjacent plate, the upper ends of said plates being curved to provide hooks, and rings engaged by said hooks to hold the armor circumferentially of the tire.

2. A tire armor comprising a circumferential series of substantially U-shaped metal plates, said plates in rocking contact at their edges adjacent to the tread, and each of said plates having centrally of the tread portion thereof a tongue and a groove with the tongue of one plate adapted to interlock with the groove of an adjacent plate, and means for holding said series of plates to the tire.

3. A tire armor comprising a circumferential series of substantially U-shaped metal plates, each of said plates having a substantially flat tread portion with the edges of said tread portion substantially parallel and the sides of a plate curving outwardly slightly from said tread portion so that the greatest width of a plate is at the curves on the sides of the section adjacent said tread but slightly above the latter, each of said plates having centrally of its tread portion a tongue and a groove adapted to interlock with corresponding parts of an adjacent plate.

4. A tire armor section consisting of a substantially U-shaped metal plate having its upper reduced ends curved to form hooks, and the inside of the plate provided with a central tongue projecting over one edge of the tread of the plate, and the other edge of the tread of the plate having a corresponding central recess flanked by upwardly extending projecting curved flanges, and said plate having recesses flanking said tongue adapted to receive corresponding flanges on another plate, said recesses being of substantial length in the direction of the length of the section and of less dimension in the direction of the projection of the tongue.

In testimony whereof I have hereunto set my hand in presence of two subscribing witnesses.

ARTHUR GALE THOMSON.

Witnesses:
CHARLES A. PENFIELD,
CHARLES EDELMAN.